(12) United States Patent
Romano et al.

(10) Patent No.: US 9,523,771 B2
(45) Date of Patent: Dec. 20, 2016

(54) SUB-RESOLUTION OPTICAL DETECTION (71) Applicant: Oculus VR, LLC, Menlo Park, CA (US)

(72) Inventors: Nitay Romano, Geva Binyamin (IL); Nadav Grossinger, Karmei Yosef (IL); Emil Alon, Pardes Hana (IL); Yair Alpern, Kiryat-Tivon (IL)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/595,369

(22) Filed: Jan. 13, 2015

(65) Prior Publication Data

US 2015/0198716 A1 Jul. 16, 2015

Related U.S. Application Data

(60) Provisional application No. 61/926,476, filed on Jan. 13, 2014.

(51) Int. Cl.
*G01B 11/14* (2006.01)
*G01S 17/06* (2006.01)
*G06F 3/01* (2006.01)
*G06F 3/03* (2006.01)
*G06T 7/00* (2006.01)
(Continued)

(52) U.S. Cl.
CPC .............. *G01S 17/06* (2013.01); *G01S 7/48* (2013.01); *G01S 7/481* (2013.01); *G06F 3/011* (2013.01); *G06F 3/017* (2013.01); *G06F 3/0304* (2013.01); *G06T 7/0057* (2013.01); *G01S 17/48* (2013.01); *G01S 17/89* (2013.01)

(58) Field of Classification Search
CPC . G01B 9/0207; G01N 21/211; G01N 21/8422; G01N 2021/8822; G01S 17/06; G01S 17/48;G01S 17/89; G01S 7/48; G01S 7/481; G01F 3/011; G01F 3/017; G01F 3/0304; G06T 7/0057
USPC .......................................... 356/601, 614–622
See application file for complete search history.

(56) References Cited

U.S. PATENT DOCUMENTS 6,493,097 B1 * 12/2002 Ivarsson ........................ 356/630
8,427,642 B2 * 4/2013 Mitchell ............ G01N 15/1459
356/343

(Continued)

FOREIGN PATENT DOCUMENTS

WO    WO 2013/088442       6/2013

OTHER PUBLICATIONS

European Search Report and the European Search Opinion Dated Apr. 24, 2015 From the European Patent Office Re. Application No. 15150899.1.

*Primary Examiner* — Tri T Ton
(74) *Attorney, Agent, or Firm* — Fenwick & West LLP (57) ABSTRACT

A detector for optical detection of location within a volume, comprises a beam source for shining a structured light pattern on the volume and a digital detector having detection pixels of a given size. The light pattern, when shone into the volume and reflected back to the detection pixels, has a brightness distribution with a peak and a surrounding brightness structure. Now often the peak may be smaller than the pixel size although the overall distribution of the brightness extends over multiple pixels. The system includes an electronic processor for assessing a distribution of brightness among the neighboring pixels to infer a location of the peak within a region smaller than the size of the central pixel on which it falls, thus giving sub-pixel resolution.

24 Claims, 9 Drawing Sheets

(51) Int. Cl.
  *G01S 7/48*     (2006.01)
  *G01S 7/481*    (2006.01)
  *G01S 17/48*        (2006.01)
  *G01S 17/89*        (2006.01)

(56) References Cited

U.S. PATENT DOCUMENTS

| | | | |
|---|---|---|---|
| 9,025,144 B2* | 5/2015 | Knox | G08B 17/125 356/337 |
| 2001/0043335 A1 | 11/2001 | Norita et al. | |
| 2007/0103440 A1 | 5/2007 | Kong et al. | |

* cited by examiner

SUB-RESOLUTION OPTICAL DETECTION

RELATED APPLICATION

This application claims the benefit of priority under 35 USC 119(e) of U.S. Provisional Patent Application No. 61/926,476 filed Jan. 13, 2014, the contents of which are incorporated herein by reference in their entirety.

FIELD AND BACKGROUND OF THE INVENTION

The present invention, in some embodiments thereof, relates to apparatus and a method for sub-resolution optical detection and, more particularly, but not exclusively, to such apparatus and a method for detection in a three-dimensional space of user interactions for operating digital equipment.

In digital image processing, sub-pixel resolution can be obtained in digital images containing well defined lines, points or edges that can be processed by an algorithm to reliably measure the position of the line, point or edge in the image with an accuracy exceeding the nominal pixel resolution of that image.

Thus, for example, if the image of a car of length 50 cm, viewed side-on is 500 pixels long the nominal resolution (pixel size) on the side of the ship facing the camera is 0.1 cm. Now sub-pixel resolution of well resolved features can measure ship movements which are an order of magnitude (10×) smaller. Movement is specifically mentioned in this discussion of the existing art because measuring absolute positions requires an accurate lens model and known reference points within the image to achieve sub-pixel position accuracy. Small movements can however be measured (down to 0.1 mm) with simple calibration procedures.

Generally, digital image processing systems are limited in resolution by a number of factors. One of these is the pixel size of the detector. Another is the nature of the scene being detected and another is the quality of the optics used to focus light from the scene onto the detector.

The system designer thus has the options of improving the optics and/or using a detector with a smaller pixel size. However both of these options increase costs. In the case of trying to detect user interactions, which is a special case of image processing, the user may be several meters from the screen, and control gestures that need to be detected may involve individual fingers.

Three-dimensional detection systems often use active illumination. In one known system, an arrangement of lasers is used to illuminate the target. The use of active illumination further complicates the issue of resolution, since the laser light beam positions are correlated with the depth of the object they are reflected from as described in triangulation depth detection methods. Therefore detecting the light feature position in sub-resolution enables measuring of the depth of the scenery in higher resolution as well. The depth issue becomes even more important when the object is located at a larger distance from the sensor. Since the laser beam is usually collimated at least in one axis and each camera pixel samples the scenery in an angular fashion, the light features may be sampled by less than a single pixel therefore preventing detection of accurate position and depth.

SUMMARY OF THE INVENTION

The present invention notes that active illumination results in beams of reflected light arriving at the detector having a Gaussian distribution of brightness, where the peak of the Gaussian may be smaller than the pixel size, but the distribution as a whole is often larger than the pixel size. The embodiments involve tracking light distribution over neighboring pixels and mapping the overall distribution pattern over multiple pixels in two or three dimensions to a spot on a single pixel which is itself smaller than the pixel size.

Some embodiments involve distorting the brightness distribution in predefined ways in order to make the mapping more accurate.

The present embodiments map absolute position, and not just motion, since a structured light pattern may be used to provide absolute reference. Thus the present embodiments allow detection of light features in sub resolution even if there is no movement.

According to an aspect of some embodiments of the present invention there is provided detection apparatus for optical detection of position within a volume, comprising:

a structured light source for shining a structured light pattern on the volume;

a digital detector having a plurality of detection pixels of a predetermined size, the light pattern when emitted into the volume and reflected back to the detection pixels having a defined distribution comprising a peak and a surrounding structure; and an electronic processor configured to assess a distribution of the peak and the surrounding structure among a plurality of the detection pixels, and to use the distribution to map a location of the peak to within a region smaller than the predetermined size.

In an embodiment, the defined distribution is either polarization or brightness.

An embodiment may comprise a diffraction element located in front of the detection pixels, the diffraction element configured to convert an incoming peak into an undiverted main peak and at least one auxiliary peak arriving at detection pixels in a vicinity of the detection pixel detecting the main peak, the electronic processor being able to use the multiple peaks to infer the location in the region.

In an embodiment, each detection pixel is divided into a plurality of zones, and wherein the processor comprises mapping logic for mapping combinations of levels of brightness on the detection pixels to one of the zones on one of the detection pixels.

In an embodiment, the mapping logic maps in two dimensions.

In an embodiment, the plurality of zones comprises at least ten zones per detection pixel, or for example twenty zones, or for example forty zones.

In an embodiment, the diffraction element is configured such that each auxiliary peak arrives at a boundary between neighbouring detection pixels when the undiverted peak arrives at a center of a first detection pixel.

An embodiment may comprise a diffraction element located on an outward beam path of the laser beams.

An embodiment may comprise a distortion element located in front of the detection pixels, the distortion element configured to apply a distortion to an incoming brightness distribution to distort the incoming distribution over a central detection pixel and neighboring pixels, the electronic processor being able to use the distortion to infer the location.

In an embodiment, each detection pixel is divided into a plurality of zones, and wherein the processor comprises mapping logic for mapping combinations of levels of brightness on the detection pixels to one of the zones on one of the detection pixels.

In an embodiment, the diffraction element is located on a lens.

According to a second aspect of the present invention there is provided a method of sub-resolution optical detection of location within a volume, comprising:

shining a structured light pattern into the volume so that objects within the volume can cause reflection from the pattern onto a detector, the detector having a plurality of detection pixels of a predetermined size, the pattern when shone into the volume and reflected back to the detection pixels having a brightness distribution comprising a peak and a surrounding brightness structure; and electronically assessing a distribution of the peak and the surrounding brightness structure between respective pixels to map a location of the peak to within a region within a single detection pixel, which region is smaller than the predetermined size.

The method may comprise converting an incoming peak into an undiverted main peak and at least one auxiliary peak arriving at detection pixels adjacent the detection pixel detecting the main peak, the electronically assessing comprising using the multiple peaks to infer the location in the region.

In an embodiment, each detection pixel is divided into a plurality of zones, and the electronically assessing comprises applying mapping logic for mapping combinations of levels of brightness on the detection pixels to one of the zones on one of the detection pixels.

An embodiment may comprise carrying out the mapping using two dimensions.

In an embodiment, the plurality of zones comprises at least ten, or in an example twenty or forty zones per detection pixel.

In an embodiment, the converting comprises applying an optical function designed to ensure that each auxiliary peak arrives at a boundary between neighbouring detection pixels when the undiverted peak arrives at a center of a first detection pixel.

The method may comprise collimating the beams.

The method may comprise applying a distortion to an incoming brightness distribution to distort the incoming distribution over a central detection pixel and neighboring pixels, the electronically assessing comprising using the distortion to infer the location.

The beams may comprise laser beams.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS
OF THE INVENTION

As explained above, the present invention, in some embodiments thereof, relates to apparatus and a method for sub-resolution optical detection and, more particularly, but not exclusively, to such apparatus and a method for detection in a three-dimensional space of user interactions for operating digital equipment.

In one embodiment a volume is actively illuminated by light beams. The light beams may be structured, for example in the form of parallel lines or spots or a grid or a combination of the above, and the beams may be produced by lasers. Individual beams as reflected from objects in the volume do not produce clear features but rather produce a smeared line or a smeared spot where the brightness has a distribution around the center, typically a Gaussian distribution. The peak part of the Gaussian may often be smaller than the size of the individual detecting pixel although the overall Gaussian distribution can be larger. The distribution of the brightness over several neighbouring pixels, gives information as to where the peak lies within the central pixel.

In an embodiment, the Gaussian spreads over several pixels to provide a brightness distribution that can be mapped. In embodiments the effect is enhanced by applying a distortion or other change to the Gaussian. For example, a diffraction element is placed in front of the sensing element, so that side peaks are generated in the neighbouring pixels. The diffraction element may be designed so that the side peaks strike the edges of neighbouring pixels when the central peak is in the middle of a pixel, giving additional differentiation, as will be explained in greater detail below. Alternatively a distortion element may simply apply a predetermined distortion that reshapes the Gaussian in a predetermined way.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
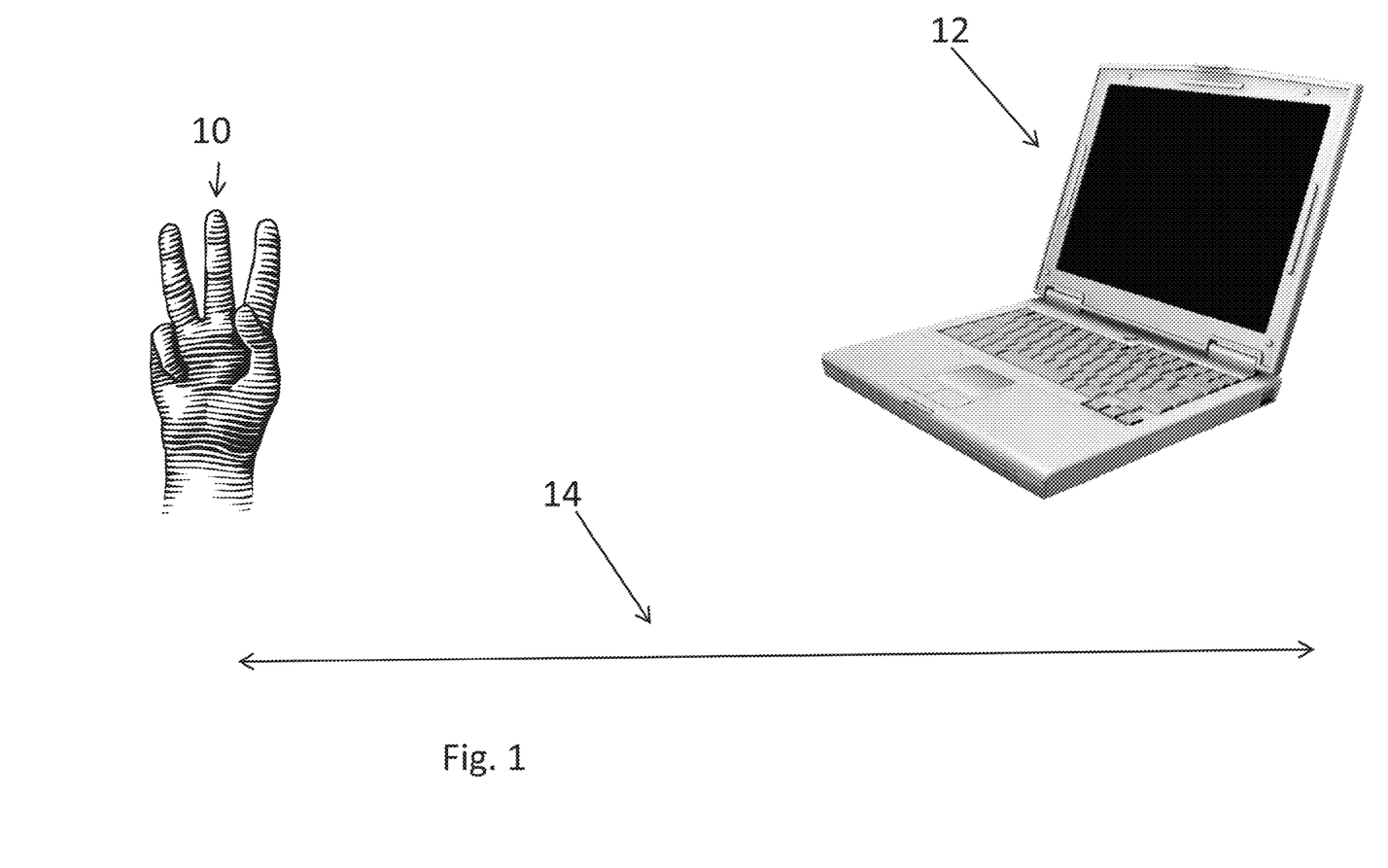
FIG. 1 is a simplified diagram illustrating a situation to which the present embodiments may be applied.

Referring now to the drawings, FIG. 1 is a simplified schematic diagram illustrating an exemplary scenario to which the present embodiments can be applied. The hand 10 of a user is using finger gestures in order to interact with computer 12. Arrow 14 indicates a distance between the hand and the computer. In the prior art the distance can be low in order to obtain high resolution but as the distance increases the resolution falls and at whatever distance, any feature in the object that subtends an angle that is smaller than the pixel size cannot be resolved. In the present embodiments on the other hand, sub-pixel size features can be resolved. Without the present embodiments, at a distance of four or five meters, each of the camera sensor pixels defines a relatively large area in space therefore enabling the detection of the light features positions only at low spatial resolution. The resolution of the depth detection is degraded as well when using triangulation methods.

An obvious solution is to obtain detectors with many more pixels. However such detectors are considerably more expensive and the respective sensitivity of such pixels is lower than required, since due to their smaller size they gather less light. In addition the computational effort significantly increases with increased number of pixels.

The present embodiments address the issue, as will be explained below, by providing sub-pixel resolution of structured light features.

Figure 2:
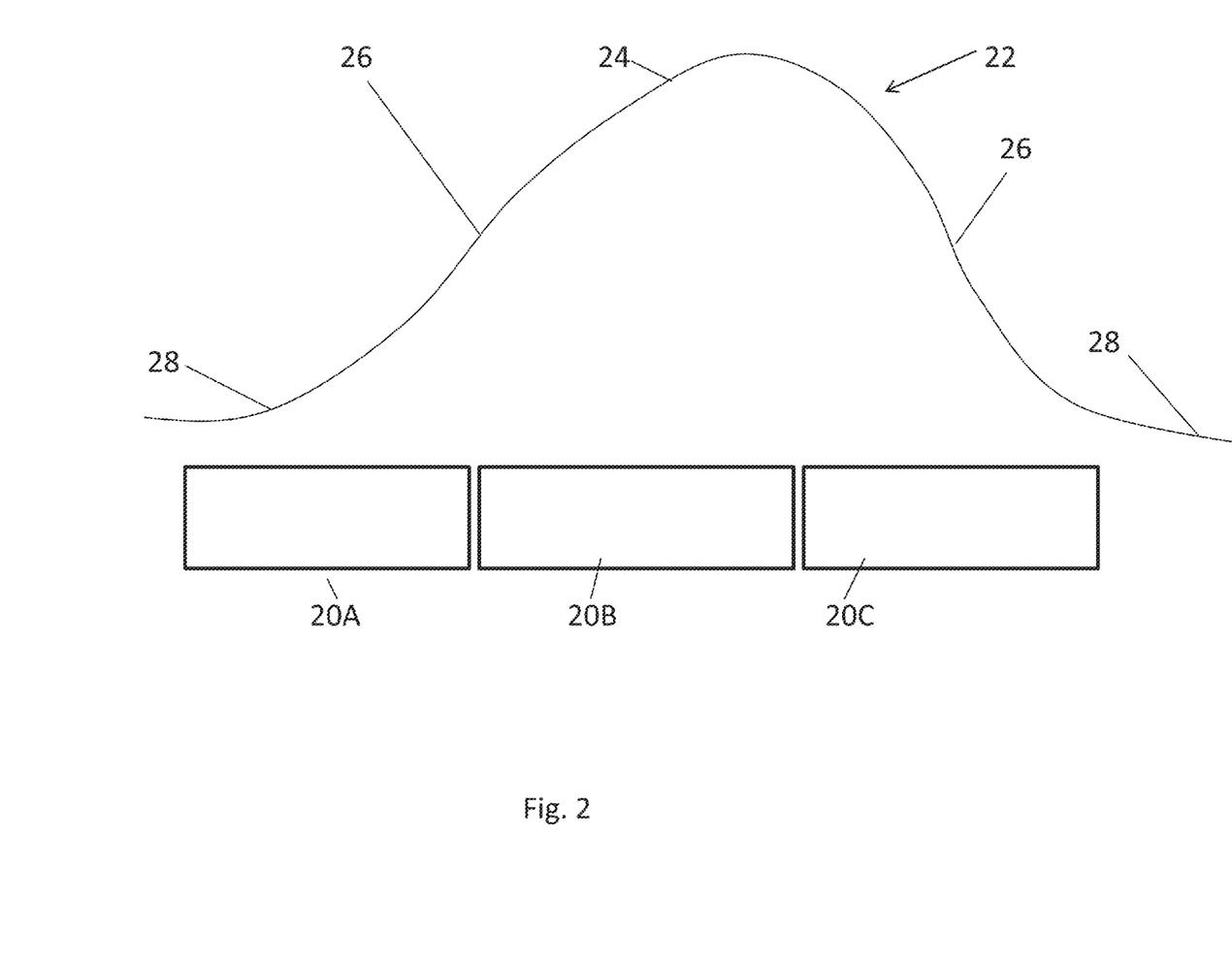
FIG. 2 is a simplified schematic diagram illustrating a brightness distribution arriving over a group of three pixels, and identifying the features of the distribution.

Reference is now made to FIG. 2, which is a simplified schematic diagram illustrating what happens optically when a reflected and somewhat distorted light distribution arrives at a detector made up of multiple pixels. Viewed schematically in two dimensions the reflected beam arrives at three detector pixels 20A, 20B and 20C as a brightness distribution 22, typically a Gaussian distribution, or slightly distorted Gaussian distribution, having a central peak 24, relatively steep regions of falloff 26 around the peak and then a relatively flat tail region 28 as the brightness tends towards zero. When the peak region 24 is wider than or as wide as the pixel size, the corresponding shape can be resolved. However if the peak is narrower than the pixel size, then in the prior art the peak cannot be localized to greater resolution than the individual pixel.

As illustrated in FIG. 2, peak 24 coincides with the right hand side of detector pixel 20B.

Figure 3:
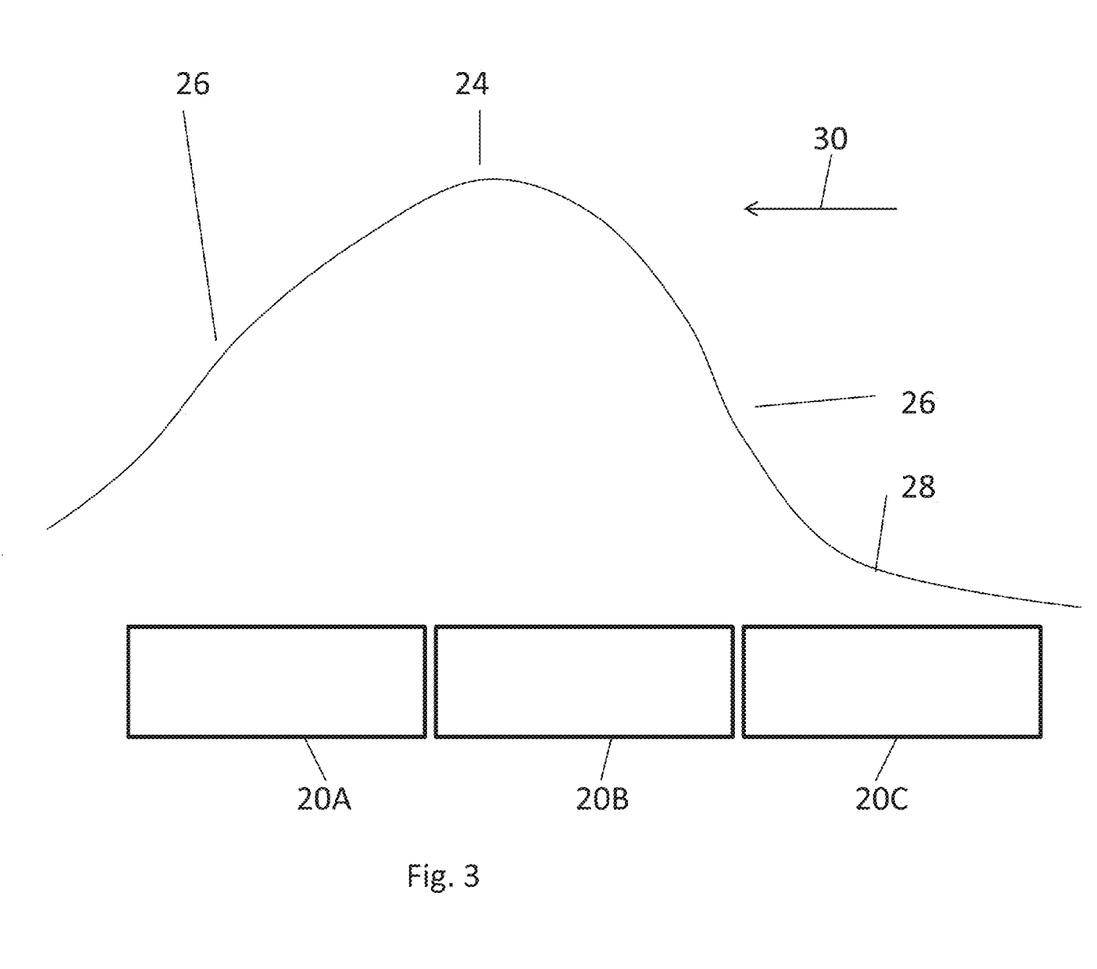
FIG. 3 is a simplified diagram showing the distribution of FIG. 2 shifted by a small distance over the central pixel.

Reference is now made to FIG. 3 which is the same view as FIG. 2 a few moments later when the Gaussian distribution has moved in accordance with arrow 30 so that now peak 24 has crossed to the opposite side of pixel 20B, a change in situation which cannot be detected by the prior art systems since the peak is still within the same pixel.

Figure 4:
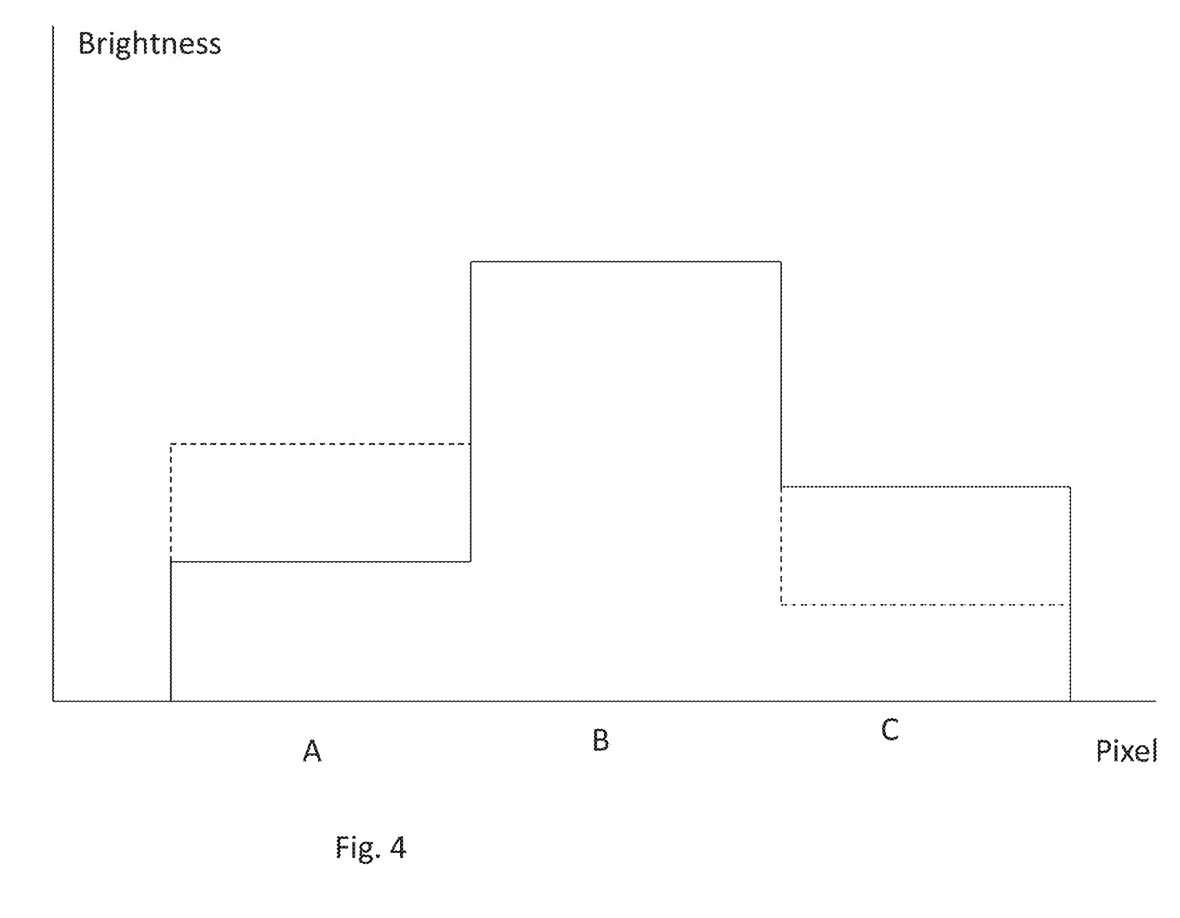
FIG. 4 is a simplified diagram showing how the brightness levels at the three pixels change during the shift between FIGS. 2 and 3 and thus illustrating how sub-pixel resolution may work according to one embodiment of the present invention.

Reference is now made to FIG. 4, which is a schematic graph illustrating the brightness at each pixel, A, B and C, and how it varies between the situations of FIG. 2 and FIG. 3, thus allowing for the sub-pixel movement between FIGS. 2 and 3 to be detected. Brightness levels indicated by continuous lines illustrate the situation of FIG. 2. Dashed lines illustrate the changes brought about as the peak moves to the position of FIG. 3.

As mentioned, the present embodiments may typically use structured light. The light may be produced by laser through a projector or optical fibers or a scanner. The structure may involve spots or parallel lines or a grid or the like, or combinations of different structures may be used. For example a finer structure may be applied to an area of particular interest as opposed to the remainder of the scene.

Considering FIG. 4 and the first thing to be noted is that at Pixel B there is no change since the peak remains within the confines of Pixel B. However, in FIG. 2, Pixel A coincides with a tail region 28, and Pixel C coincides with a slope region 26. In FIG. 3 the situation is reversed as the peak has moved away from pixel A towards pixel C. Thus pixel C coincides with a tail region 28 and pixel A with a slope region 26. Thus, as illustrated in FIG. 4, as the peak moves towards pixel A, the brightness at pixel A increases. At the same time, the peak moves away from pixel C and the brightness at pixel C decreases. It is to be noted that the changes in brightness levels are continuous between the positions illustrated, and a signal processor, see below, is able to follow the dynamic changes in brightness level, deduce a motion of the peak, and resolve successive positions of the peak within the pixel B as the peak moves across the pixel. It is further noted that motion is not required for the present embodiments to work. Rather each combination of pixel brightness corresponds to an exact location of the peak even without movement. The sub resolution is thus detectable in a single frame.

Figure 5:
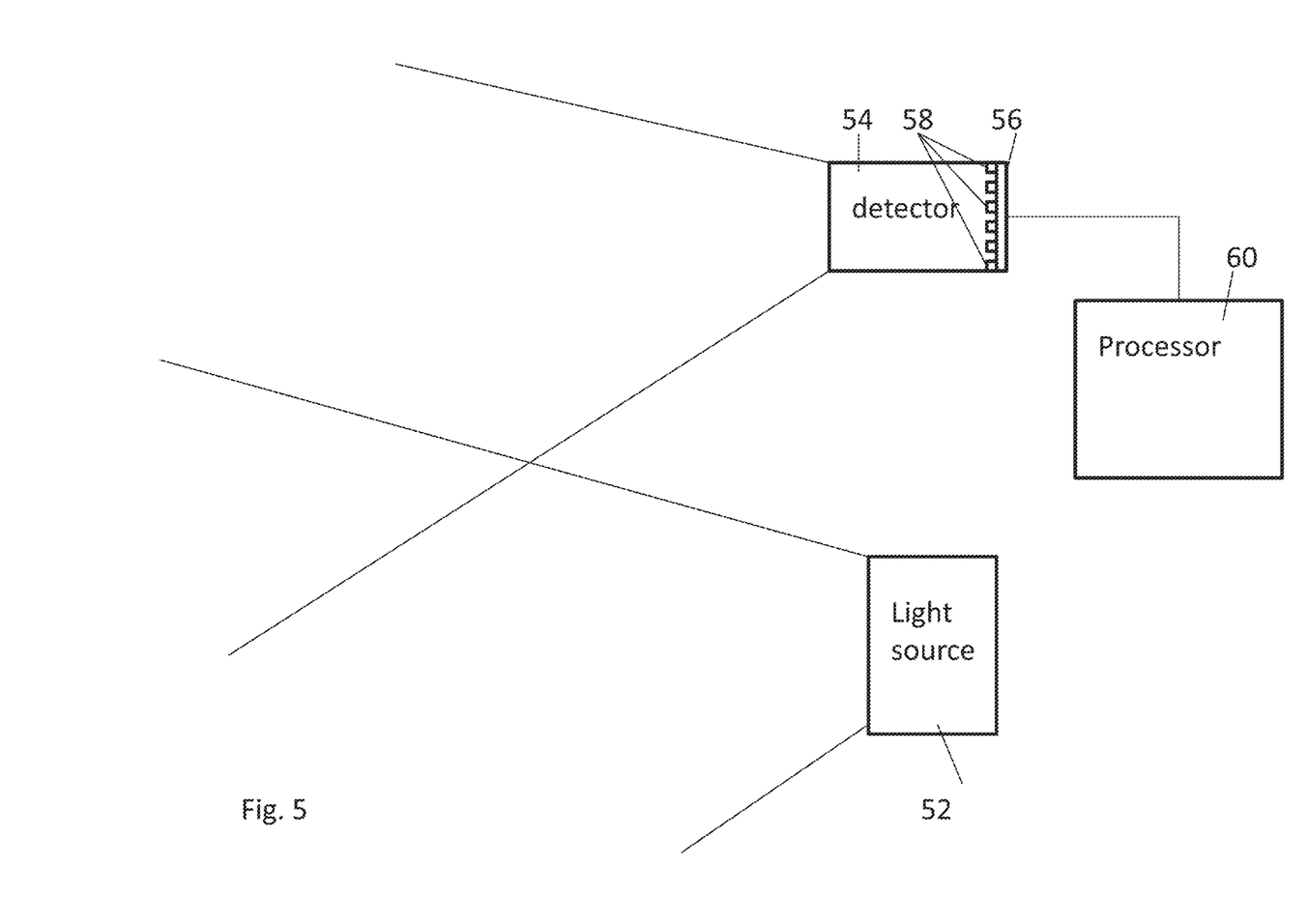
FIG. 5 is a simplified diagram illustrating apparatus for carrying out the sub-pixel resolution of FIG. 4 using a structured light pattern.

Reference is now made to FIG. 5, which is a simplified schematic diagram illustrating a detector apparatus for illuminating a volume and optically detecting object position, object depth and optionally, movement of the objects therein at sub-pixel resolution according to an embodiment of the present invention. Detector apparatus 50 comprises a light source 52 which shines structured light beams onto the volume. The light source is typically a laser source that uses semiconductor edge emitting lasers or VCSEL lasers.

A digital detector 54, typically a camera, has a sensor 56 with detection pixels 58 of a particular size. As discussed, the laser beams, when shone into the volume and reflected back to the detection pixels 58, have a brightness distribution having a peak. In one case the peak may be smaller than the pixel size. An alternative case is that of light saturation, in which case the peak is the entire saturated area, which may be an entire pixel or more, so the interest may be in the area around the peak in surrounding pixels. Electronic processor 60 assesses a distribution of brightness between neighbouring pixels to infer a location of the peak or underlying feature within a region smaller than the actual pixel size. The brightness distribution may be static or in some cases dynamic, as discussed above in respect of FIG. 4. Although the overall brightness level remains fairly flat on the pixel on which the peak traverses, it rises and falls fairly sharply at the neighbouring pixels during the traverse of the central pixel.

It is noted that both the previous embodiments and that of FIG. 5, structured light may be used. Therefore a diffractive element is in both cases located in front of the laser. A collimator is also typically provided. The embodiment of FIG. 5 may have an additional diffractive element located in front of the camera sensor in order to manage light distribution around the neighbouring sensors.

As mentioned above, structured light may also be generated using a scanner, so that an initial diffractive element may not be needed in front of the light source.

Figure 6:
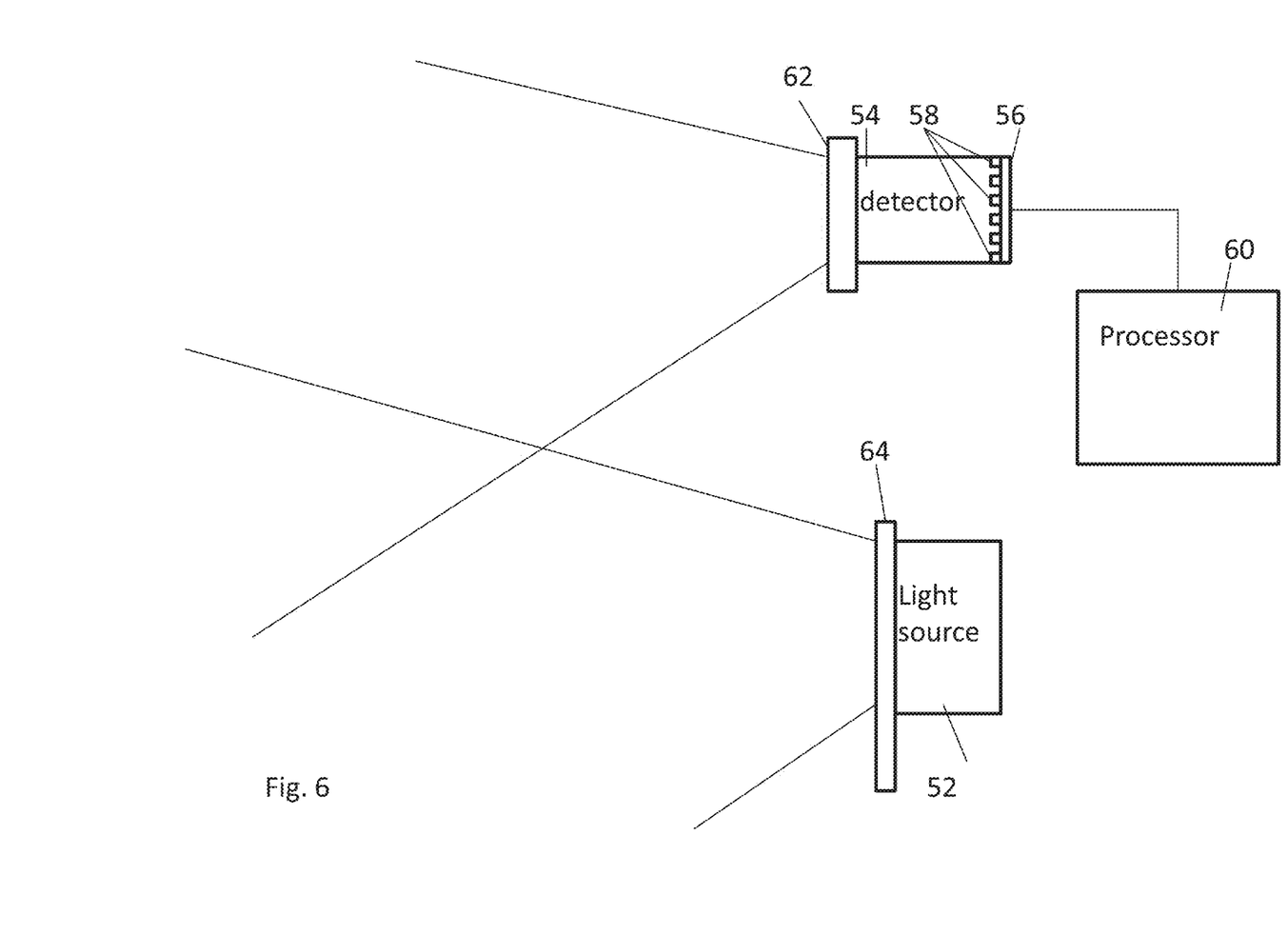
FIG. 6 is a simplified diagram illustrating apparatus for carrying out sub-pixel detection according to a second embodiment of the present invention.

Reference is now made to FIG. 6, which is a simplified diagram illustrating a variation of the embodiment of FIG. 5 in which a diffraction element 62 is used. A pattern generator element 64 may be placed in front of laser source 52 to generate a structured light pattern of laser beams, and then diffraction element 62 splits each incoming beam at detector 54 into three beams, a central beam and two side beams. It will be appreciated that in a three-dimensional version the effect would be a central peak surrounded by a ring or any combination of a central peak surrounded by discrete or continues peaks. The diffraction element is arranged so that when the central peak falls on the center of a pixel, the side peaks fall on boundaries of the neighbouring peaks. The brightness distribution is shown in FIG. 7.

The pattern generator element 64 may be implemented by a suitable diffraction element, a laser scanner, or any other multiple lasers arrangement.

Figure 7:
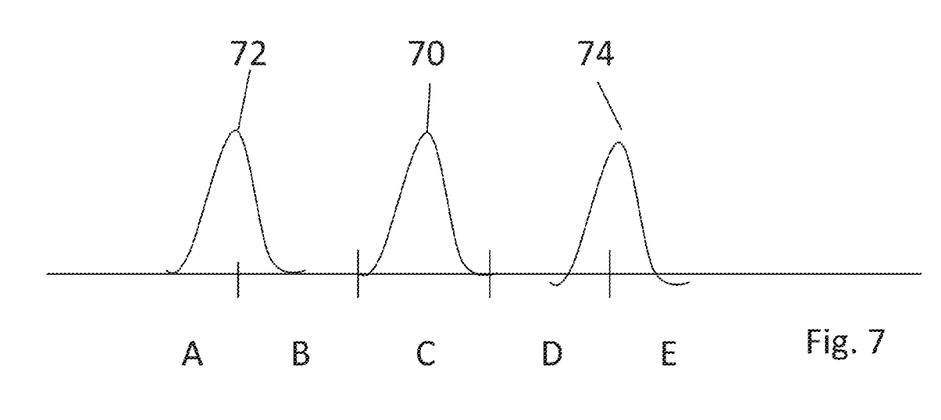
FIG. 7 is a simplified diagram showing beam distributions of a split beam over neighbouring pixels using the apparatus of FIG. 6.

In FIG. 7, a main beam 70 falls on a central pixel, C, of a set of five pixels A to E. Side beams 72 and 74 fall on the boundaries of pixels A and B, and D and E respectively.

Figure 8:
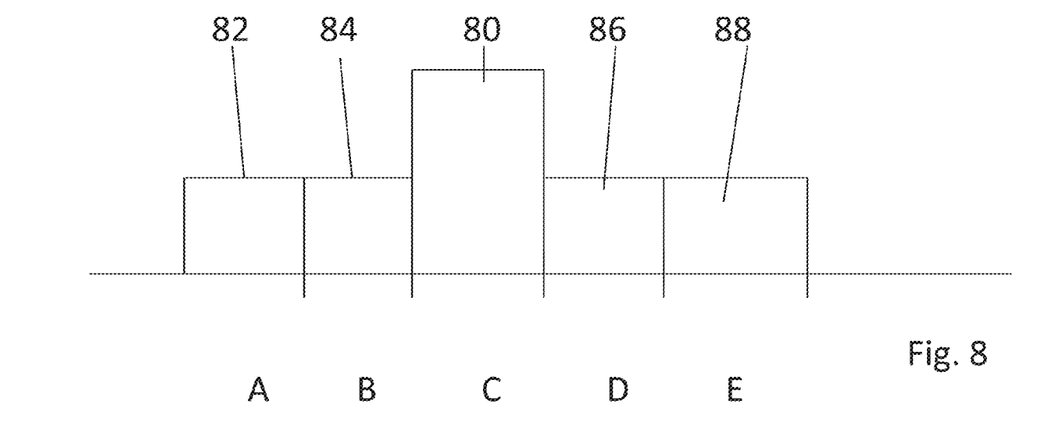
FIG. 8 is a simplified diagram illustrating brightnesses detected at the pixels of FIG. 7.

Reference is now made to FIG. 8, which shows the corresponding brightness levels registered by the pixels. Pixel C sees a brightness level 80 corresponding to a full beam distribution. Pixels A, B, D and E each see brightness levels 82, 84, 86 and 88, each equivalent to half a beam distribution.

Figure 9:
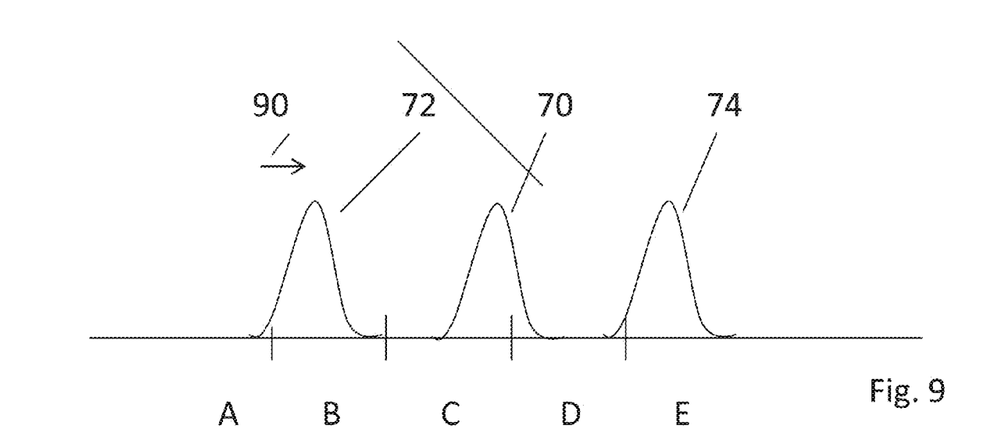
FIG. 9 is a simplified diagram showing beam distributions of the split beam of FIG. 7 over neighbouring pixels following a small shift.
Figure 10:
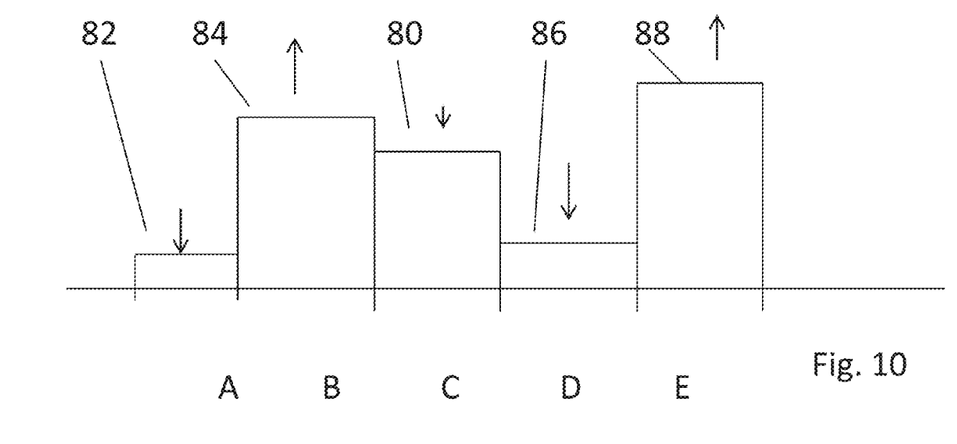
FIG. 10 is a simplified diagram illustrating brightnesses detected at the pixels of FIG. 9.

FIGS. 9 and 10 illustrate the situation when the object causing the peaks moves slightly in the direction of arrow 90. The central peak 70 moves towards the boundary between pixels C and D. Side peak 72 moves towards the centre of pixel B, and side pixel 74 moves towards the center of pixel E. Looking at FIG. 10 the brightness level 82 at pixel A drops almost to zero. The level 84 at pixel B rises almost to the maximum. The level 80 at pixel C falls somewhat. The level 86 at pixel D falls considerably, but not as much as pixel A since it reflects two tails. The brightness level 88 at pixel E rises almost to a maximum. Again the situation is dynamic and every position of the peak across pixel C will have a different signature of brightness levels across pixels A to E.

Thus the level of resolution of the passage of the peak brightness across pixel C is limited only by the ability to discern different brightness levels at the individual pixels, and the numbers of different combinations of brightness levels among the pixels concerned. Thus, each detection pixel may be divided into multiple detection zones whose size is dictated by used combinations of the number of resolvable brightness levels. The processor 60 provides the mapping logic for mapping the different combinations of levels of brightness on the detection pixels A to E to one of the zones on the central one of the group of detection pixels involved. An embodiment may allow a resolution level of one tenth of the pixel size.

It will be appreciated that as the beam from the object moves across the detector, different pixels in turn serve as the central and neighbouring pixels. In addition the neighboring pixels need not be adjacent to each other but may be any predefined pixels arrangement.

The mapping logic may map in two or three dimensions. The figures show two dimensions for simplicity but the skilled person will appreciate that a three dimensional system is generally required in a practical situation.

Returning to FIG. 6 and, in place of a diffraction element, the element 62 may be a distortion element. The distortion element simply distorts the Gaussian distribution of the brightness into any predetermined shape that spreads over neighboring pixels and allows the passage of the peak over the central pixel to be resolved. The distortion may involve side peaks and thus work in a way that is similar to that of the diffraction element embodiment. Alternatively the distortion may sharpen the central peak and redistribute the energy in the tail region. Alternatively any other distortion giving information about the location of the peak based on brightness changes in the central and neighbouring pixels may be used.

Figure 11:
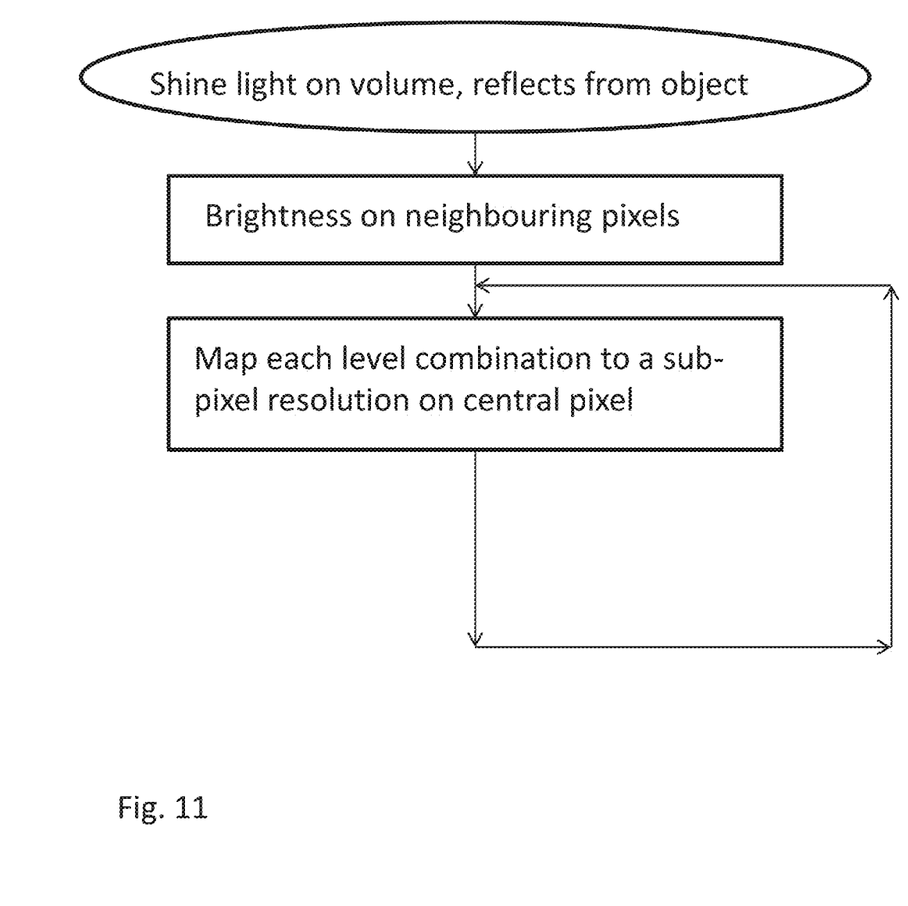
FIG. 11 is a simplified flow chart illustrating a method of sub-pixel resolution according to embodiments of the present invention.

Reference is now made to FIG. 11, which illustrates a method of sub-resolution optical detection of movement within a volume, for use with the apparatus described above. The method comprises shining light beams into the volume so that objects within the volume can cause reflection of the beams onto a detector. The detector has detection pixels as discussed. The beams when shone into the volume and reflected back to the detection pixels have a brightness distribution, such as a Gaussian distribution, which has a peak. The peak is smaller than the pixel size. The method involves electronically assessing a distribution of brightness between neighbouring pixels. The distribution is then used to infer, for example by mapping, a location of the peak within a region within a single, central detection pixel, which region is smaller than the pixel size.

If the object moves the brightness levels of the pixels change, and the motion of the peak within the central pixel of the group can be traced.

The method may further involve applying diffraction to the beam as it arrives at the detector, so as to generate side peaks. The level of diffraction may be chosen so that the side peaks arrive at gaps between pixels when the main peak arrives at the center of a pixel, so as to maximize the effect of motion on the brightness levels over the group of pixels.

The method may include dividing each pixel into discrete zones. Typically the number of zones is selected based on the resolvable number of brightness levels and combinations that can be detected. Image processing then serves to map each pattern of brightness levels at the pixels into a zone on the central pixel. The mapping may be in two or three dimensions.

A typical resolution for the mapping is about one tenth of the pixel size, which may allow standard off-the shelf detectors to accurately detect finger motion at a distance of four or five meters.

The beams may be collimated at the beam source.

In an alternative embodiment, the method may comprise applying a distortion to the incoming brightness distribution to distort the incoming distribution over a central detection pixel and neighboring pixels in a way that allows movement to be accurately measured.

It is expected that during the life of a patent maturing from this application many relevant detecting technologies including different types of illumination beam and different types of detector will be developed and the scope of the corresponding terms is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the above description is to be construed as if this combination were explicitly written. Conversely, various features of the invention, which are, for brevity, described in the context of a single embodiment, may also be provided separately or in any suitable subcombination or as suitable in any other described embodiment of the invention, and the above description is to be construed as if these separate embodiments were explicitly written. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An apparatus, comprising:
   a structured light source for projecting a structured light pattern into a volume;
   a digital detector having a plurality of detection pixels configured to receive the structured light pattern reflected from the volume; and
   an electronic processor coupled to the digital detector configured to receive pixel values indicating a light intensity signal related to the structured light pattern reflected from the volume, the light intensity signal includes a peak and a surrounding structure, wherein the electronic processor is further configured to
   analyze, across a subset of the detection pixels having the pixel values, a distribution of the peak and the surrounding structure, and
   determine, based on the analysis, a location of the peak within a region smaller than a size of a detection pixel of the plurality of detection pixels.

2. The apparatus of claim 1, wherein the distribution indicates brightness of the received structured light pattern reflected from the volume across the subset of the detection pixels.

3. The apparatus of claim 1, further comprising a diffraction element located in front of the plurality of detection pixels.

4. The apparatus of claim 3, wherein the diffraction element is configured to convert, at the digital detector, the structured light pattern reflected from the volume into the pixel values indicating the light intensity signal having an undiverted main peak and at least one auxiliary peak in the surrounding structure across the subset of the detection pixels, and wherein the electronic processor is further configured to infer the location of the peak within the region based on the main peak and the at least one auxiliary peak.

5. The apparatus of claim 4, wherein the diffraction element is configured to place the at least one auxiliary peak in a vicinity of a detection pixel in the subset of the detection pixels detecting the main peak.

6. The apparatus of claim 2, wherein each detection pixel of the plurality of detection pixels is divided into a plurality of zones, and wherein the processor is configured to map combinations of levels of the brightness across the subset of the detection pixels to one of the zones on a detection pixel in the subset of the detection pixels.

7. The apparatus of claim 6, wherein the combinations of levels of the brightness comprise levels of brightness in two spatial dimensions across the subset of the detection pixels.

8. The apparatus of claim 6, wherein the plurality of zones comprises at least five zones per detection pixel.

9. The apparatus of claim 4, wherein the diffraction element is configured such that each of the at least one auxiliary peak is located at a boundary between two or more detection pixels in the subset of the detection pixels when the undiverted main peak is located at a center of a first detection pixel in the subset of the detection pixels.

10. The apparatus of claim 1, further comprising a diffraction element located on an outward beam path of the structured light pattern from the structured light source into the volume.

11. The apparatus of claim 1, further comprising a distortion element located in front of the plurality of detection pixels, wherein the distortion element is configured to distort the structured light pattern reflected from the volume producing distorted brightness distribution over a central detection pixel and neighboring pixels of the subset of the detection pixels, and wherein the electronic processor is further configured to infer the location of the peak based on the distorted brightness distribution.

12. The apparatus of claim 11, wherein each detection pixel of the plurality of detection pixels is divided into a plurality of zones, and wherein the processor is further configured to map combinations of levels of the distorted brightness distribution across the subset of the detection pixels to one of the zones on a detection pixel in the subset of the detection pixels.

13. The apparatus of claim 3, wherein the diffraction element is located on a lens in front of the digital detector.

14. A method, comprising:
    projecting a structured light pattern into a volume;

receiving, at a plurality of detection pixels, the structured light pattern reflected from the volume;

receiving pixel values indicating a light intensity signal related to the structured light pattern reflected from the volume, the light intensity signal includes a peak and a surrounding structure;

analyzing, across a subset of the detection pixels having the pixel values, a distribution of the peak and the surrounding structure; and determining, based on the analysis, a location of the peak within a region smaller than a size of a detection pixel of the plurality of detection pixels.

15. The method of claim 14, wherein the distribution indicates brightness of the received structured light pattern reflected from the volume across the subset of the detection pixels.

16. The method of claim 14, further comprising:

converting the structured light pattern reflected from the volume into the pixel values indicating the light intensity signal having an undiverted main peak and at least one auxiliary peak at one or more detection pixels in the subset adjacent to a detection pixel in the subset detecting the main peak; and wherein determining the location of the peak comprises inferring the location of the peak within the region based on the main peak and the at least one auxiliary peak.

17. The method of claim 15, wherein each detection pixel of the plurality of detection pixels is divided into a plurality of zones, and wherein determining the location of the peak comprises mapping combinations of levels of the brightness across the subset of the detection pixels to one of the zones on a detection pixel in the subset of the detection pixels.

18. The method of claim 17, further comprising performing the mapping in two spatial dimensions across the subset of the detection pixels.

19. The method of claim 17, wherein the plurality of zones comprises at least ten zones per detection pixel.

20. The method of claim 16, wherein converting comprises applying an optical function designed to ensure that each of the at least one auxiliary peak is located at a boundary between two or more detection pixels in the subset of the detection pixels when the undiverted main peak is located at a center of a first detection pixel in the subset of the detection pixels.

21. The method of claim 14, further comprising collimating beams of the structured light pattern when projecting the structured light pattern into the volume.

22. The method of claim 14, further comprising distorting the structured light pattern reflected from the volume producing distorted brightness distribution over a central detection pixel and neighboring pixels of the subset of the detection pixels, and wherein determining the location of the peak comprises inferring the location of the peak based on the distorted brightness distribution.

23. The method of claim 22, wherein each detection pixel of the plurality of detection pixels is divided into a plurality of zones, and wherein determining the location of the peak comprises mapping combinations of levels of the distorted brightness distribution across the subset of the detection pixels to one of the zones on a detection pixel in the subset of the detection pixels.

24. The method of claim 14, wherein beams of the structured light pattern comprise laser beams.

* * * * *

UNITED STATES PATENT AND TRADEMARK OFFICE
CERTIFICATE OF CORRECTION

PATENT NO.        : 9,523,771 B2
APPLICATION NO.   : 14/595369
DATED             : December 20, 2016
INVENTOR(S)       : Nitay Romano et al.

Page 1 of 1

It is certified that error appears in the above-identified patent and that said Letters Patent is hereby corrected as shown below:

On the Title Page

Item (71), delete "Oculus VR, LLC" and insert -- Facebook, Inc. --.

Signed and Sealed this
Second Day of January, 2018

Joseph Matal
*Performing the Functions and Duties of the*
*Under Secretary of Commerce for Intellectual Property and*
*Director of the United States Patent and Trademark Office*